(12) United States Patent
Katz

(10) Patent No.: US 11,545,021 B2
(45) Date of Patent: Jan. 3, 2023

(54) PANOPTES DEVICE OR IMAGE ACQUISITION SYSTEM HAVING MULTIPLE INDEPENDENT SENSORS

(71) Applicant: Storevision North America, Inc., Bridgeport, PA (US)

(72) Inventor: Barry Katz, Bridgeport, PA (US)

(73) Assignee: Storevision North America, Inc., Bridgeport, PA (US)

( * ) Notice: Subject to any disclaimer, the term of this patent is extended or adjusted under 35 U.S.C. 154(b) by 0 days.

(21) Appl. No.: 16/972,665

(22) PCT Filed: Jun. 7, 2019

(86) PCT No.: PCT/US2019/035969
§ 371 (c)(1),
(2) Date: Dec. 7, 2020

(87) PCT Pub. No.: WO2019/236953
PCT Pub. Date: Dec. 12, 2019

(65) Prior Publication Data
US 2021/0248894 A1  Aug. 12, 2021

Related U.S. Application Data

(60) Provisional application No. 62/682,258, filed on Jun. 8, 2018.

(51) Int. Cl.
*G08B 21/04* (2006.01)
*G08B 21/02* (2006.01)

(52) U.S. Cl.
CPC ....... *G08B 21/0492* (2013.01); *G08B 21/028* (2013.01); *G08B 21/0476* (2013.01)

(58) Field of Classification Search
CPC ................................................. G08B 21/0492
See application file for complete search history.

(56) References Cited

U.S. PATENT DOCUMENTS 7,702,236 B2 * 4/2010 Steinberg ............. H04N 5/3572
396/213
8,473,525 B2 * 6/2013 McIntyre ............ G06F 16/5838
707/803

(Continued)

FOREIGN PATENT DOCUMENTS

EP          936808 A1 *  8/1999

*Primary Examiner* — Travis R Hunnings
(74) *Attorney, Agent, or Firm* — Joseph F. Aceto, Esq.

(57) ABSTRACT

An acquisition imaging system is described herein that acquires multiple images from multiple imagers where each are sent to a single processor/controller, resulting in a single, resultant image providing a detailed field of view. The system is comprised of multiple sets of images taken by multiple sensors, strategically placed to acquire multiple perspectives of an image field. Each sensor is packaged with digitization, compression and communication components in an imager to allow for the transfer of the image to a processor/controller system controller. The system's controller acts as the network interface, power supply and centralized management for processing information, specifically the analytics. The present invention has applications in surveillance, event classification systems, indexed archival storage, real-time and post facto image content analytics, future filtering vectors; ad hoc querying, automatic queries, and multiple query languages.

19 Claims, 5 Drawing Sheets

(56) References Cited

U.S. PATENT DOCUMENTS

| | | | | |
|---|---|---|---|---|
| 9,497,202 B1* | 11/2016 | Calo | ................... | G06F 16/583 |
| 9,769,900 B2* | 9/2017 | Underwood | ........... | H05B 45/22 |
| 2009/0180699 A1* | 7/2009 | Boliek | ................... | H04N 19/63 |
| | | | | 382/232 |
| 2010/0270459 A1* | 10/2010 | Augusto | ........... | H01L 27/14837 |
| | | | | 250/208.1 |
| 2012/0229656 A1* | 9/2012 | Cok | ..................... | H04N 5/765 |
| | | | | 348/207.1 |
| 2015/0309490 A1* | 10/2015 | Patel | ................... | G05B 15/02 |
| | | | | 700/49 |
| 2016/0203694 A1* | 7/2016 | Hogasten | ........... | G08B 21/0476 |
| | | | | 348/164 |

* cited by examiner

System Architecture

Single Connect Gondola

Pass Through Gondola

Sensor Bus Gondola

PANOPTES DEVICE OR IMAGE ACQUISITION SYSTEM HAVING MULTIPLE INDEPENDENT SENSORS

CROSS REFERENCE TO RELATED APPLICATIONS

This application is the US national application of PCT/US2019/035969, filed on 7 Jun. 2019, which claims priority to U.S. Provisional Application No. 62/682,258, filed on 8 Jun. 2018, now expired, the disclosures of which are herein incorporated by reference in its entirety.

BACKGROUND OF THE INVENTION

1. Field of the Invention

The present invention relates to imaging devices or more specifically the acquisition, transmission and processing of images collected from multiple sensors.

2. Description of the Prior Art

Recently, extensive research has been conducted on the acquisition and analysis of complementary imaging using two or more sensors to improve the accuracy and reliability of image processing, such as change detection, motion detection, super-resolution image restoration and object recognition/tracking, which are used in many technical applications such as monitoring, surveillance, traffic, inventory, process, and medical imaging systems.

Conventional approaches for acquiring multiple images incorporate a multi-camera system which is mounted with multiple cameras in an integrated manner such that the multiple cameras provide an image to the processor which renders a result image showing a result of the processed images. Another conventional approach to imaging includes moving a single image acquisition camera to different positions. Both approaches are costly and require extensive hardware strategically placed for complete viewing. Both approaches are limited by providing images from a single point of view; even in the case of a 180, 360, or 720 degree camera the system is installed so as to have a single viewpoint and cannot be used to view an object from two or more perspectives.

The present invention incorporates these concepts in a series of image acquisition sensors packaged together or separately with digitization, compression and communication components but remotely connected to controllers in a cost-effective configuration. Cost reductions are achieved by reducing manufacturing costs and by reducing installation, mounting, aiming and scene setting costs. The imagers and processor/controller are controlled through wired and wireless communication devices which also acts as a power supply and centralized management.

SUMMARY OF THE INVENTION

An imaging system is described herein that acquires multiple images from multiple imagers where each are sent to a single processor/controller, resulting in the capacity to render single images with controllable multiple points of view and a multiplicity of multi cell image arrays where image layout and image array sequences are under control. The system is comprised of multiple sets of images taken by multiple sensors, strategically placed to acquire multiple perspectives of an image field. Each sensor is packaged with digitization, compression and communication components to allow for the transfer of the image to a processor/controller system controller. The system's controller acts as the network interface, power supply and centralized management for processing information, specifically the analytics. This Panoptes imaging system as described herein acquires multiple images of a target area, giving it the ability to provide optimal scene creation using multiple point of view and multiple resolutions.

The embodiments of the image acquisition and management system described herein have applications and support applications in surveillance, event classification systems, indexed archival storage, real-time and post facto image content analytics, future filtering vectors; ad hoc querying, automatic queries, and multiple query languages. Further, the system provided for the isolation of stored video within and between individual image files.

Further, the PanOptes design can provide infrastructure to manage and communicate signals, messages, and data from these sensors in a more cost-effective method than that currently in use such as individual systems installed by individual vendors, intrusion, file, burglary, Electronic Article Surveillance (EAS), temperature control, people counting, facial recognition, fire, audio, digital signage, etc.

DETAILED DESCRIPTION

Figure 1:
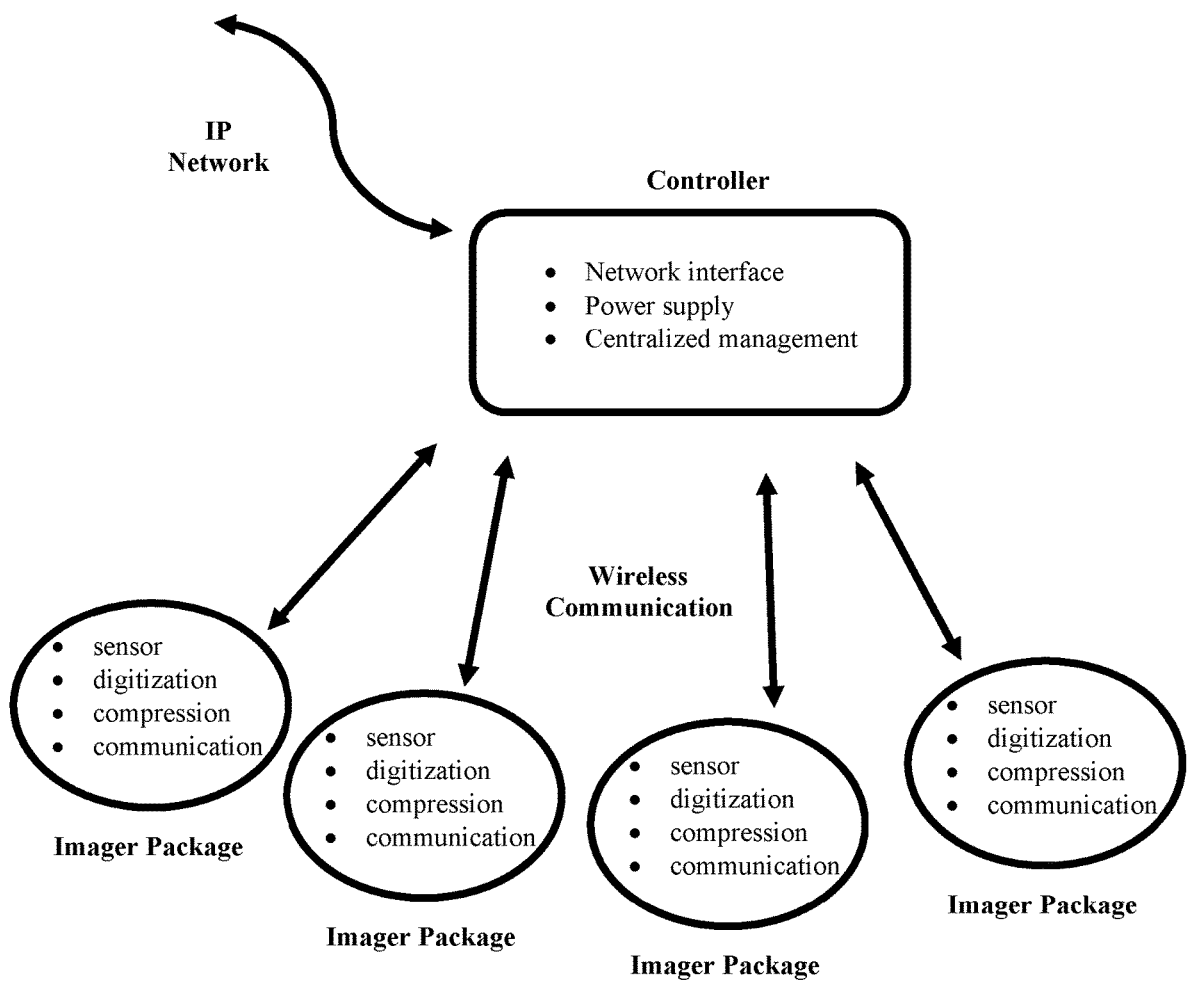
FIG. 1 is a schematic representation of the image acquisition system overview having a central controller interfaced with independent imagers within existing structures to provide optimal scene creation.

In the following detailed description, numerous specific details are set forth in order to provide a thorough understanding of the present invention. However, well-known methods, procedures, systems, and components have not been described in detail so as not to unnecessarily obscure aspects of the various embodiments.

The present invention describes an image acquisition and management system having components and controllers designed to support surveillance systems, event classification systems, indexed archival storage, real-time and post facto image content analytics, future filtering vectors, ad hoc querying, automatic queries, and multiple query languages, along with the analysis of stored video within and between individual image files. The system is designed primarily to be internet protocol (IP) compliant and benefit from installation in or on interior fixtures, fittings, and other surfaces in the interior or exterior of buildings. Accordingly, the PanOptes design is based on the deconstruction of the IP camera whereby separate components are independently installed to best suit an interior room design and area of coverage in a cost-effective installation, having system implementation and certification. PanOptes also includes deconstruction of Video Management Systems so that the required system functions are performed by a distributed hardware platform.

The PanOptes design provides the infrastructure to manage and communicate signals, messages, and data from sensors in a more cost-effective method than that currently available through individual systems installed by individual vendors. These sensors include, but not limited to, the following: intrusion, file, burglary, EAS, temperature control, people counting, facial recognition, fire, audio, digital signage, etc.

In a preferred embodiment, the PanOptes device comprises at least one imager, each imager having image acquisition sensors packaged with digitization, compression and communication components that are connected serially and/or in parallel to controllers.

Another embodiment incorporates the flexibility for installation of the imager where the optimal scene creation is maintained with multiple points of view and multiple resolutions. The imager packaging is readily supported within the existing interior design structures such as walls, ceilings, soffits, moldings, thresholds, etc. Further, the image packaging is readily incorporated into devices, fixtures, fittings, signage, display cases, shelving, lighting etc., either at the manufacturers level or as a fabrication in existing devices.

When installed with and as part of other fittings, fixtures, devices, the need and cost of labor for camera installation along with the camera is eliminated. This cost savings is further obtained with aiming for scene creation. Scene creation, aiming and system configuration in the present invention are performed over network connections without the need for adjustment at the imager. Further, incorporating a high-resolution imager provides raster which supports selection of an area most useful in collecting target information.

In each installation type, the image package has the capacity to be installed in a discrete, unobtrusive, and attractive part of the interior design.

A still further embodiment includes controllers that format the images received from the imagers, processes the images, and optionally adds event classification metadata to be used by upstream processes and applications. Various upstream examples include, but not limited to, JPEG images at high resolution used for event classification, people counting, demographic classification, facial or full body classification and recognition, and/or the state of physical areas or machines, including the state of a selling floor area or the display cases, shelving and end caps.

A still further embodiment incorporates various compressions used in the art, including H264, H265, jpeg 2000 and others at resolutions and frame sizes that are optimized for use.

An exemplary use includes, but not limited to, live surveillance on site, either over a network or in the cloud. Compressed streams are processed to include metadata that facilitates and optimizes display renderings for human viewers. These are provided as stitching, arrays, rotation of a point of view. Other aspects may include captions that display data such as people, events, or conditions in the scene using metadata provided by the image system of the present invention, either alone or in combination with other systems such as access control, alarm, POS and other data systems. Compressed streams may further include metadata to facilitate and optimize searches, queries, filters for research, editing, montage creation, evidentiary documentation, and case building. These compressed streams offer optimal system performance support and network security.

The image acquisition components and controllers of the present invention are designed to support ambient non-directed, image collection that collects images that include the maximum area at the most useful resolution to support the listed functions and from the maximum points of view to support the use of multiple images per rendering. Images collected to support deep learning applications where specific values and goals emerge from the data through non-directed searches and reinforcement learning techniques. Image files are formatted to provide maximum image data based on time (or number of frames) to be retained for each purpose. Known methods of raising resolution and number of frames in the sequence can be applied when needed.

The image acquisition system of the present invention is designed as part of architectural design of interior and exterior of buildings to support maximum safety, security and efficient operation of activities that will take place in the building. Aesthetic considerations include discretion, unobtrusiveness, and enhancement of interior design where possible.

One advantage of the image acquisition system in the present invention incorporates the image capture, control and transmission devises into building structures, fixtures, and fittings with connections for power and communications that support full image system configurations and scene design of the installed system without requiring adjustment or aiming of the image capture components by an individual user.

Finally, an image management system firmware (controller) and software (computer) are designed to employ images from multiple points of view at multiple frame rates and at resolutions as source data.

FIG. 1 is an overview of the image acquisition system of the present invention. Independent imagers containing sensors packaged with digitization, compression and communication components are strategically incorporated within the existing interior design structures such as walls, ceilings, soffits, moldings, thresholds. Alternatively, the image packaging is readily incorporated into devices, fixtures, fittings, signage, display cases, shelving, lighting, either at the manufacturers level or as a fabrication in existing devices. Wireless communication to a remotely connected system controller acts as the network interface for the independent imagers, functions as the power supply and provides centralized management. The controller connects the system to an IP network.

Figure 2:
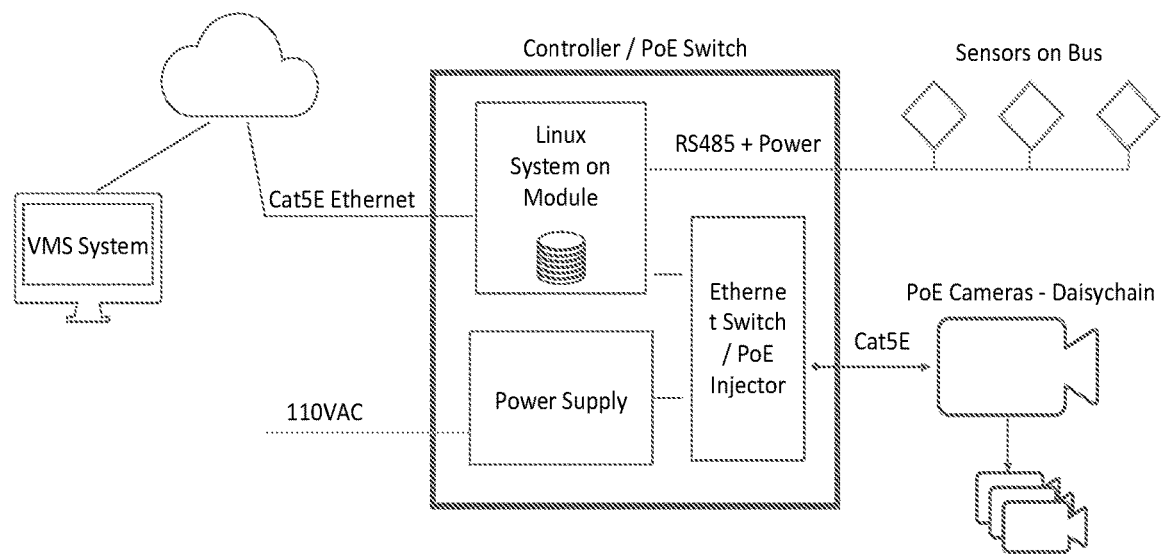
FIG. 2 is a schematic representation of the system architecture showing the camera and sensors communicating through the controller with ethernet access by a VMS system.

FIG. 2 is a schematic showing one embodiment for the general system architecture and the relationship between the system components. Daisychain cameras are POE enabled so that only the network connection needs to be made. The Power Over Ethernet (PoE) network cables carry electrical power and provide a network connection for the system. A Cat-5e network cabling provides an ethernet connection to the controller of up to 100 MHz and can be used up to a maximum length of 100 meters. The sensors are in a bus having a parallel connection for carrying data and control signals. A controller with a POE switch incorporates a Linux System module for processing input from the sensors through an RS485 network. An Ethernet switch/POE injector interfaces a power supply and module with Linux System. The Cat-5e network provides access to a Video Management System (VMS).

Figure 3:
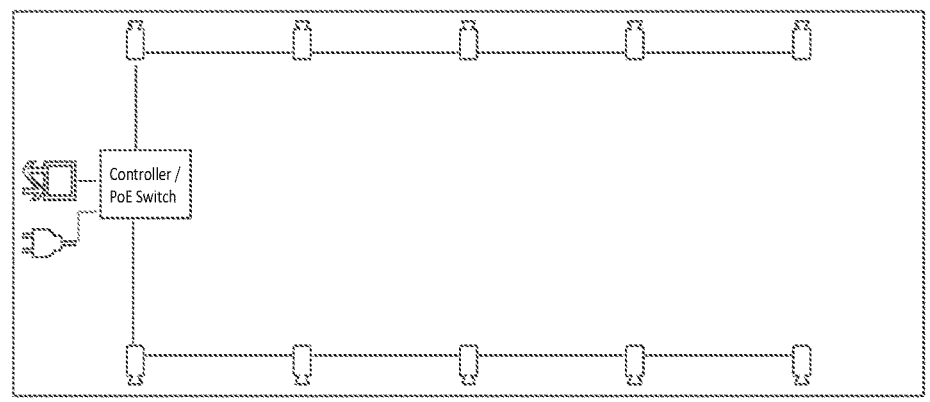
FIG. 3 is a schematic representation of a single connect gondola showing a serial connection of multiple cameras.

FIG. 3 is a schematic representation of a single connect gondola having a daisychain, parallel arrangement of cameras that feed into the controller.

Figure 4:
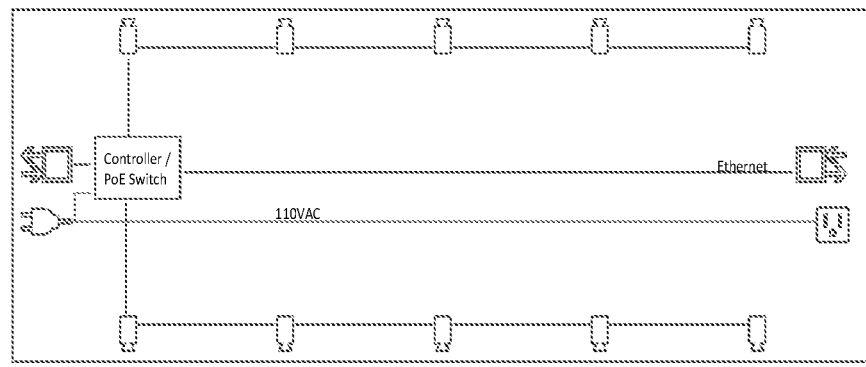
FIG. 4 is a schematic representation of a pass-through gondola showing ethernet access to the controller.

FIG. 4 is a schematic representation of a pass-through gondola showing the daisychain, parallel arrangement of cameras. With a VMS System connected through the Ethernet.

Figure 5:
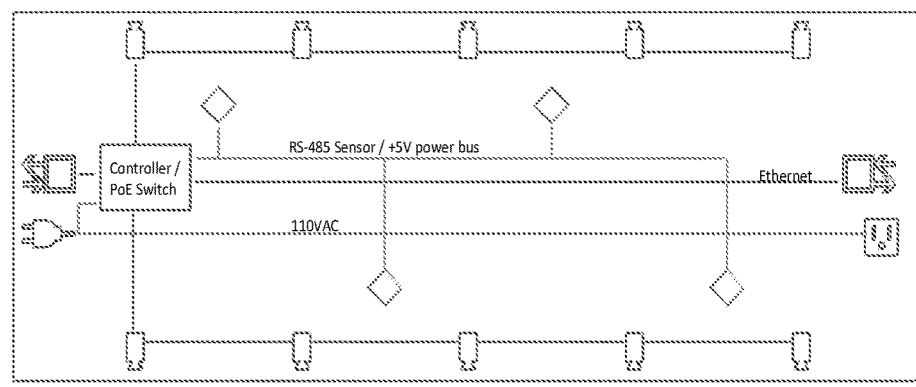
FIG. 5 is a schematic representation of a sensor bus gondola showing the RS-485 Sensor power bus.

FIG. 5 is a schematic representation of a sensor bus gondola having the the daisychain, parallel arrangement of cameras with a VMS System and a series of sensors on a bus connection.

Although not limiting, these schematic representations show different embodiments for a system architecture.

Although illustrated and described above with reference to certain specific embodiments, the present invention nevertheless is not intended to be limited to the details shown. Rather, various modifications may be made in the details within the scope and range of equivalents of the claims and without departing from the spirit of the invention.

I claim:

1. An image acquisition system comprising:
    a. at least one imager for combining detection and raw image production;
    b. a controller capable of uncompressed or compressed formats;
    c. a network incorporating ethernet with cables having at least 100 meters; and
    d. a wireless two-way communication means between components a, b, and c, where a resulting image is obtained having an optimal scene creation for supporting live data extractions for human readable images used in live surveillance as well as archival search and event documentation as well as machine vision, computer vision, and process such as content analytics and artificial intelligence.

2. The image acquisition system of claim 1 where the system is a single connect gondola having wiring, custom conduit, and brackets to pre aim imagers.

3. The image acquisition system of claim 1 where the system is a pass-through gondola.

4. The image acquisition system of claim 1 where the system is a sensor bus packaged in custom conduit fabricated and installed to include component mounting brackets, slots, posts, and tabs on the gondola.

5. The image acquisition system of claim 1 where the controller adds event classification metadata for upstream applications.

6. The image acquisition system of claim 5 where the metadata is a JPEG image.

7. The image acquisition system of claim 1 further interfaced with a VMS System.

8. The image acquisition system of claim 7 where the VMS System is an access control, alarm, or POS.

9. The image acquisition system of claim 1 comprising:
    a. one or more sensors having one or more lenses with different field of view, focal length, and point of focus to support multiple functions and downstream applications;
    b. a digitization means;
    c. a data processing means;
    d. a compression means; and
    e. a communication means, wherein components a, b, c, d and e are separately packaged within an existing sign, lighting, sound speaker fixture or machine packaged together in an existing design.

10. The image acquisition system of claim 9 wherein the sensor image data is selected from the group consisting of intrusion sensors, file sensors, burglary sensors, Electronic Article Surveillance (EAS), temperature control sensors, people counting sensors, facial recognition sensors, fire sensors, audio sensors, digital signage sensors and combinations thereof.

11. The image acquisition system of claim 9 wherein the sensors are packaged in a bus having a parallel connection.

12. The image acquisition system of claim 9 where the compression means are JPEG H264, H265, or raw preprocessed image data.

13. The image acquisition system of claim 9 where the existing structure is the interior or exterior of a building.

14. The image acquisition system of claim 9 wherein the existing structure is an interior structure selected from the group consisting of walls, ceilings, soffits, moldings, and thresholds.

15. The image acquisition system of claim 9 wherein the existing structure is an interior structure selected from the group consisting of fixtures, fittings, signage, display cases, shelving, and lighting.

16. The image acquisition system of claim 9 wherein the existing structure is a light fixture.

17. The image acquisition system of claim 9 wherein the communication means connects multiple imagers serially or in parallel.

18. A kit for image acquisition imaging comprising:
    a. a sensor having at least one imager capable of assuring usable image system inputs for multiple applications;
    b. a digitization means having a network for incorporating Ethernet with cables having at least 100 meters;
    c. a processing means;
    d. a controller having an uncompressed and compression means format; and
    e. a wireless two-way communication means between a, b, c and d, wherein components a, b, c, d and e are packaged into a single unit for incorporating into an interior structure selected from the group consisting of fixtures, fittings, signage, display cases, shelving, and lighting.

19. The kit of claim 18 wherein the sensor is selected from the group consisting of intrusion sensors, file sensors, burglary sensors, Electronic Article Surveillance (EAS), temperature control sensors, people counting sensors, facial recognition sensors, fire sensors, audio sensors, digital signage sensors and combinations thereof.

* * * * *